C. A. DAVIS.
Assignor to the S. S. White Dental Manufacturing Company.
VULCANIZER.
No. 11,105. Reissued Aug. 26, 1890.
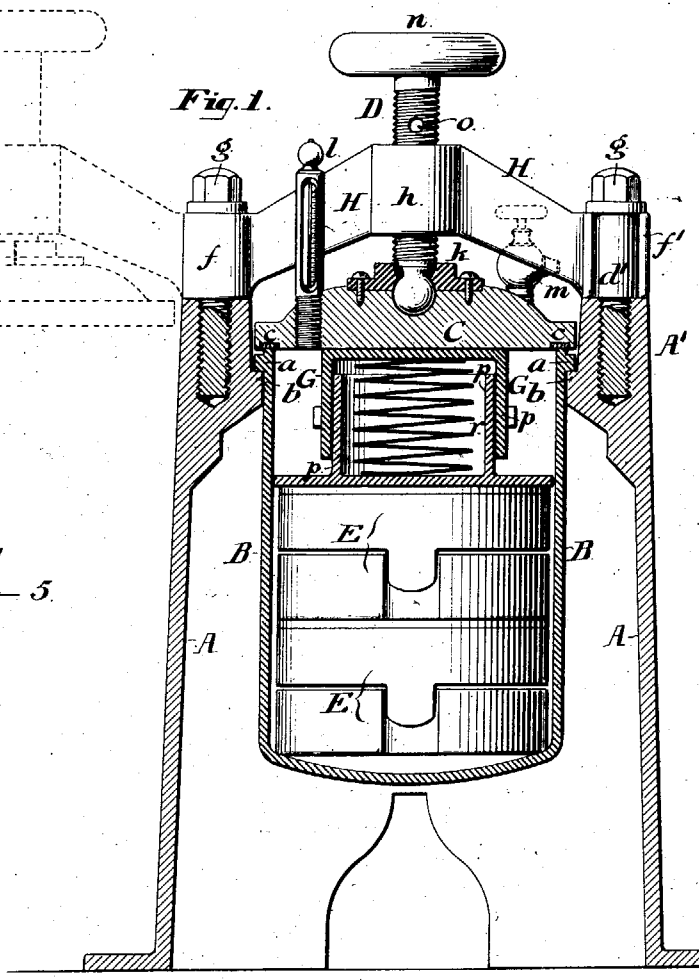
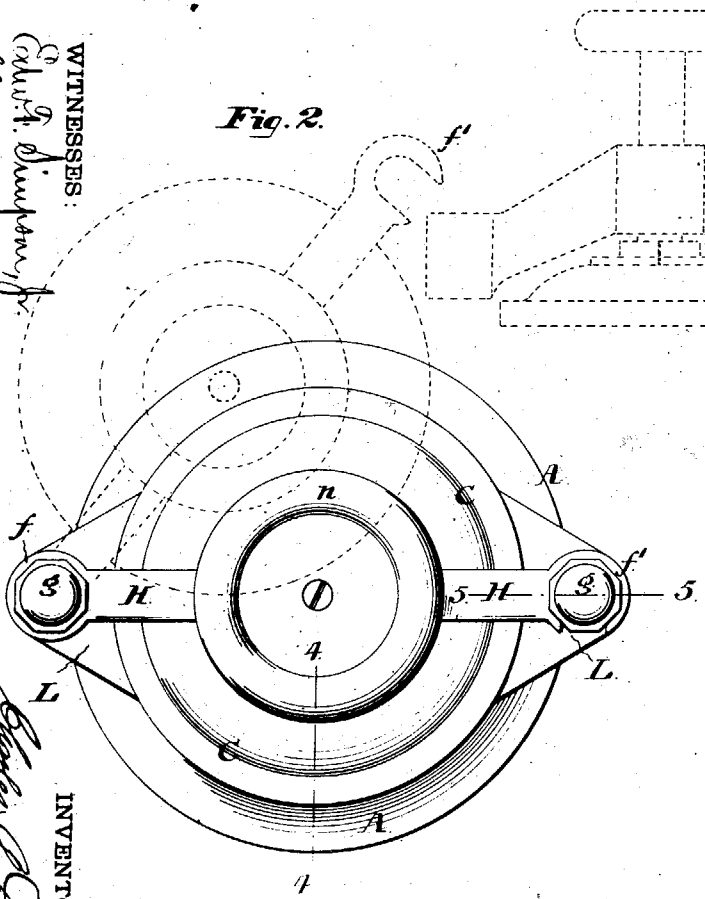
WITNESSES:
Edw. T. Simpson, Jr.
Lloyd P. Humphrey
INVENTOR
Charles A. Davis
By his Atty
J. S. Peyton 2 Sheets—Sheet 2.
C. A. DAVIS.
Assignor to the S. S. WHITE DENTAL MANUFACTURING COMPANY.
VULCANIZER.
No. 11,105. Reissued Aug. 26, 1890.
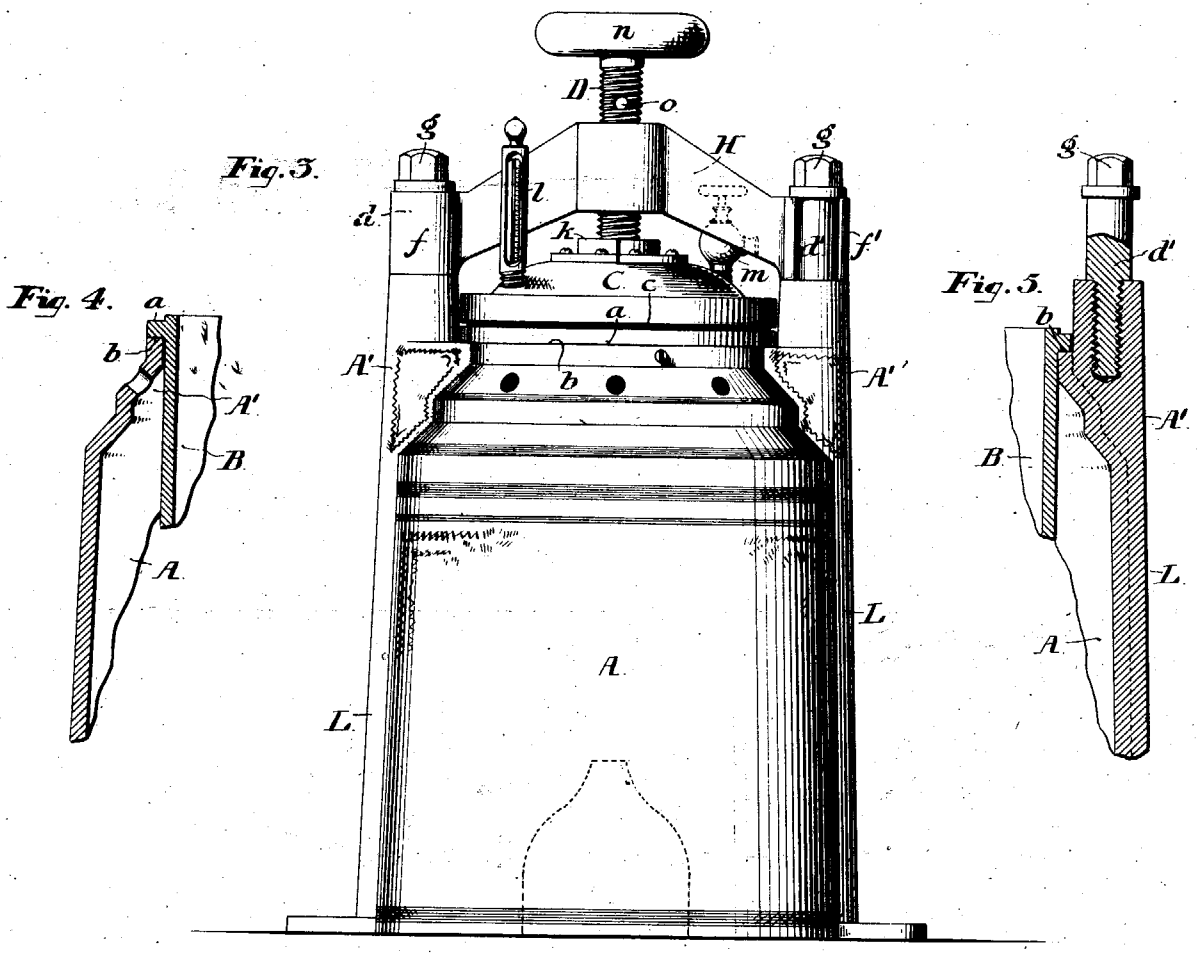
WITNESSES:
Edwd. T. Simpson, Jr.
Lloyd P. Murphey
INVENTOR
Charles A. Davis
By Atty
R. H. Peyton

UNITED STATES PATENT OFFICE.

CHARLES A. DAVIS, OF ROCHESTER, NEW YORK, ASSIGNOR TO THE S. S. WHITE DENTAL MANUFACTURING COMPANY, OF PHILADELPHIA, PENNSYLVANIA.

VULCANIZER.

SPECIFICATION forming part of Reissued Letters Patent No. 11,105, dated August 26, 1890.

Original No. 420,590, dated February 4, 1890. Application for reissue filed June 18, 1890. Serial No. 355,906.

*To all whom it may concern:*

Be it known that I, CHARLES A. DAVIS, of Rochester, in the county of Monroe and State of New York, have invented certain new and useful Improvements in Vulcanizers, of which the following is a specification.

My invention relates to improvements in apparatus of the class employed by dentists and others for vulcanizing dental plates and various articles of rubber, such apparatus comprising as essential features an outer casing, sometimes made in a single piece and sometimes in sections, and constituting a support for the apparatus, a suitable heater within and at the base of said support, a pot or boiler of less diameter than and sustained within the support, with a closed bottom located above the heater and having an open top to adapt it to receive the flasks containing the rubber to be vulcanized, a lid or cover and packing for closing the boiler-top, means for forcing the cover down upon the boiler-top to close it steam-tight, and a gage to indicate the temperature within the boiler. In such apparatus as usually constructed the covers have either been screwed directly to the open tops of the boilers or otherwise attached to or carried thereby.

My object mainly is to provide a vulcanizer with the cover for the boiler connected with and carried by a support surrounding the boiler, and to so construct and fit the boiler within said support that it may readily be placed therein and removed therefrom and be replaced by another without injury to or necessitating the loss of other parts of the apparatus. To this end I have devised a novel organization of parts, as hereinafter claimed.

In the accompanying drawings, which show a vulcanizer embodying my improvements, Figure 1 is a view partly in elevation and partly in vertical central section. Fig. 2 is a plan or top view showing a slightly-modified construction; Fig. 3, a view in elevation thereof; and Figs. 4 and 5 are views in vertical section in the planes of the lines 4 and 5, respectively, of Fig. 2, showing portions of the support and boiler.

The casing or support A, which is shown as constructed in one piece, is made thicker and stronger than heretofore usual, in order that it may withstand the strain to which it is subjected by the clamping of the cover upon the boiler, as farther on explained. A suitable heater is employed, as customary, to heat the open-topped pot or boiler B, which is of a diameter sufficiently less than the internal diameter of the support for the greater portion of the height of the latter to provide the usual heat-circulating space about the boiler. The boiler is adapted to be sustained within and by the support in such manner that it may readily be placed therein and taken out without removal of other parts of the apparatus, except such as may be contained within the boiler, and the boiler when in place is adapted to be quickly and tightly closed at the top by a cover and clamping mechanism wholly distinct and disconnected from it.

The upper portion A′ of the support A is thickened and projects inwardly, thus terminating the heat-circulating space and serving to sustain the boiler, which is provided with a shoulder or flange *a*, resting on a seat or supporting-shoulder *b* of the support.

The cover C and suitable packing *c* are adapted to be pressed down upon the boiler-top to close the boiler steam-tight. The cover, instead of being attached to or connected with the boiler, as heretofore, is independent thereof, being connected with and carried by the outside support A A′ in manner as now to be described.

An arched or centrally-raised yoke H, with which the cover is connected, serves to connect the cover with the upper end or portion A′ of the support. The yoke is adapted to swing horizontally to carry the cover over and upon and away from the open-topped boiler, and is also adapted to be held firmly connected with the support when the cover is in position for clamping upon and closing the boiler-top. One end of the yoke has a bearing or support *f*, fitted to turn on a pin *d*, secured to the support. The other end of the yoke has a hook or open socket *f′* for engaging with a pin *d′* at the side of the support opposite that to which the pivot-pin for the yoke is located. The thickening of the upper portion of the support adapts it to have the pins *d d'* secured thereto by screwing them in place, these pins being in the form of screw-bolts, with heads *g g* serving to hold down the yoke. A screw D passes through a threaded central opening of the yoke and serves to connect the cover with the yoke. This screw is provided at its lower end with a ball that fits and turns in a socket of the cover and allows the latter to adjust itself properly upon the packing and boiler-top. The ball is held to the cover by a divided cap *k*, as will readily be understood. The screw D is provided at top with a hand-wheel *n* for turning it and may have a hole *o* for the insertion of a lever to turn it when great pressure is required. The cover is provided with the usual gage *l* and blow-off *m*. With the yoke secured as in Fig. 1 it is only necessary to turn down the screw with sufficient force to close the cover steam-tight upon the boiler, and to inspect or remove the boiler the screw is turned in the direction to move it upward and lift the cover from the boiler, the yoke end *f'* is disengaged from the pin *d'*, and the yoke then swung around, as indicated by dotted lines in the drawings, leaving the top of the boiler entirely open and removing all obstruction to its removal.

From the above description it will be seen that when the cover is clamped in place the boiler is confined between it and the seat provided by the support, the support in reality constituting a part of the clamping mechanism; also, that by making the cover and clamping mechanism distinct from and unattached to the boiler the latter can be taken out of the support at will, a longer or shorter boiler substituted for the one before in use, and when a boiler is worn out or defective another may be quickly applied in its place without further loss or inconvenience, which, obviously, would not be the case were the cover attached directly to or carried by the boiler. It will further be seen that as the cover is attached to the horizontally-swinging yoke it remains connected with the apparatus when swung to one side, with the gage and blow-off maintained in their normal upright positions and not liable to injury.

The flasks E, each made in two parts which are slightly separated, are placed in the boiler in the usual way. For the purpose of holding the flasks firmly in place and for gradually closing them as the rubber softens I employ a stiff metallic spring *r*, inclosed within a telescoping casing or box G, made up of two parts *p p*, one sliding within the other. This box rests on the top of the flasks, and when expanded stands above the top of the boiler. When the cover is forced down to close the boiler steam-tight, it acts to compress the spring, thus exerting pressure on the flasks and maintaining the rubber under constant pressure.

In the construction shown by Figs. 2, 3, 4, and 5, the support is thickened at diametrically-opposite points by projecting outwardly, as well as provided at top with the inward projection, which is, however, of less thickness than before shown. The outward projections are provided by the columns L L. In this way, while the top of the support is made of a thickness at opposite points sufficient to receive the pins *d d'*, connecting the yoke with the support, it is also extended inwardly sufficiently to form the shoulder *b* for sustaining the boiler and providing the heat-circulating space below this shoulder.

I claim as my invention—

1. The combination of the open-topped boiler provided with the flange or shoulder, the support provided with the seat upon which the shoulder of the boiler rests, the cover for the boiler-top, and means connecting the cover with the support for forcing the cover down upon the boiler-top, substantially as and for the purpose set forth.

2. The combination of the open-topped boiler provided with the flange or shoulder, the support provided with the seat upon which the shoulder of the boiler rests, the cover for closing the boiler-top, the yoke connecting with the support, and the screw connecting the yoke and cover and serving to clamp the cover upon the boiler, substantially as and for the purpose set forth.

3. The combination of the open-topped boiler provided with the flange or shoulder, the support provided with the seat upon which the shoulder of the boiler rests, the cover for closing the boiler-top, the swinging yoke hinged to the support, and the screw connecting the yoke and cover, substantially as and for the purpose set forth.

4. The combination of the open-topped boiler, the support within which the boiler rests, the cover for closing the boiler, the means for clamping down the cover, a flask within the boiler, and the spring confined between the cover and flask and borne upon by the cover for exerting constant pressure upon the flask when the boiler is closed, substantially as set forth.

In witness whereof I have hereunto signed my name in the presence of two subscribing witnesses.

CHARLES A. DAVIS.

Witnesses:
ELI T. STARR,
J. A. B. WILLIAMS.